(12) United States Patent
Walton et al.

(10) Patent No.: US 7,614,611 B1
(45) Date of Patent: Nov. 10, 2009

(54) SHEAVE AND SHEAVE SYSTEM

(76) Inventors: Stewart Walton, 20 Clipper Dr., Mystic, CT (US) 06355; Richard Cazeault, 17 Indian La., Webster, MA (US) 01570

( * ) Notice: Subject to any disclaimer, the term of this patent is extended or adjusted under 35 U.S.C. 154(b) by 0 days.

(21) Appl. No.: 12/170,890

(22) Filed: Jul. 10, 2008

(51) Int. Cl.
*B66D 3/08* (2006.01)
(52) U.S. Cl. .................................................. 254/393
(58) Field of Classification Search ................ 254/390, 254/393, 404, 412, 416
See application file for complete search history.

(56) References Cited

U.S. PATENT DOCUMENTS

| | | | |
|---|---|---|---|
| 2,452,458 A | 10/1948 | Hahn | |
| 3,108,483 A | 10/1963 | Williams | |
| 3,137,177 A | 6/1964 | Barnet | |
| 4,037,486 A | 7/1977 | Schultz, Jr. | |
| 4,197,756 A | 4/1980 | Yaros | |
| 5,398,433 A * | 3/1995 | Dretzka | 37/399 |
| 6,405,833 B1 | 6/2002 | Baranda | |
| 6,638,390 B1 | 10/2003 | Sizelove | |
| 2004/0178398 A1 | 9/2004 | Miller | |

* cited by examiner

*Primary Examiner*—Emmanuel M Marcelo

(57) ABSTRACT

A sheave comprising: a sheave body, the sheave body comprising: a groove; a sheave body outer diameter; a sheave body inner diameter; a sheave sleeve fixedly attached to the sheave body inner diameter, the sheave sleeve comprising: a sleeve bore; a sleeve outer diameter that is about the same as the sheave body inner diameter as to allow a fixed attachment between the sleeve and sheave body; and a sleeve inner diameter. A sheave system comprising: a first grooved sheave, with an outer diameter of a first value; a first groove size, and a sheave body inner diameter of a first value; a second grooved sheave, with an outer diameter of a second value; a second groove size, and a sheave body inner diameter of a first value; a third grooved sheave, with an outer diameter of a third value; a third groove size, and a sheave body inner diameter of a first value; a first sheave sleeve configured to be fixedly attached to any of the first through third grooved sheaves, the first sheave sleeve comprising: a first sleeve bore, with a first sleeve inner diameter of a first value; a first sleeve outer diameter that is about the same as the sheave body inner diameter as to allow a fixed attachment between the sleeve and any of the first through third grooved sheaves; a second sheave sleeve configured to be fixedly attached to any of the first through third grooved sheaves, the second sheave sleeve comprising: a second sleeve bore, with a second sleeve inner diameter of a second value; a second outer diameter that is about the same as the sheave body inner diameter as to allow a fixed attachment between the second sheave sleeve and any of the first through third grooved sheaves; a third sheave sleeve configured to be fixedly attached to any of the first through third grooved sheaves, the third sheave sleeve comprising: a third sleeve bore, with a third sleeve inner diameter of a third value; and a third sleeve outer diameter that is about the same as the sheave body inner diameter as to allow a fixed attachment between the sleeve and any of the first through third grooved sheaves.

6 Claims, 4 Drawing Sheets

SHEAVE AND SHEAVE SYSTEM

TECHNICAL FIELD

This invention relates generally to a sheave and a sheave system, and more particularly to a sheave and sheave system that can be easily adapted to various requirements of users.

BACKGROUND

Sheaves are grooved wheels or pulleys used with rope, wire or chain. Sheaves are often used to change the direction and point of application of pulling force. Selecting sheaves requires an analysis of product specifications, including but not limited to: cable size, outer diameter (OD) of the sheave, the material the sheave is to be made out of, the bore size, the sheave body width, the type of groove, the type and size and bearing that fits in the bore. Manufacturing and supplying the properly specified sheaves to a customer may take anywhere from 4 to 26 weeks.

Accordingly, there is a need for a sheave that can be provided to customer with shorter lead times and or lower inventory costs.

SUMMARY

The disclosed invention relates to a sheave comprising: a sheave body, the sheave body comprising: a groove; a sheave body outer diameter; a sheave body inner diameter; a sheave sleeve fixedly attached to the sheave body inner diameter, the sheave sleeve comprising: a sleeve bore; a sleeve outer diameter that is about the same as the sheave body inner diameter as to allow a fixed attachment between the sleeve and sheave body; and a sleeve inner diameter.

The disclosed invention also relates to a sheave system comprising: a first grooved sheave, with an outer diameter of a first value; a first groove size, and a sheave body inner diameter of a first value; a second grooved sheave, with an outer diameter of a second value; a second groove size, and a sheave body inner diameter of a first value; a third grooved sheave, with an outer diameter of a third value; a third groove size, and a sheave body inner diameter of a first value; a first sheave sleeve configured to be fixedly attached to any of the first through third grooved sheaves, the first sheave sleeve comprising: a first sleeve bore, with a first sleeve inner diameter of a first value; a first sleeve outer diameter that is about the same as the sheave body inner diameter as to allow a fixed attachment between the sleeve and any of the first through third grooved sheaves; a second sheave sleeve configured to be fixedly attached to any of the first through third grooved sheaves, the second sheave sleeve comprising: a second sleeve bore, with a second sleeve inner diameter of a second value; a second outer diameter that is about the same as the sheave body inner diameter as to allow a fixed attachment between the second sheave sleeve and any of the first through third grooved sheaves; a third sheave sleeve configured to be fixedly attached to any of the first through third grooved sheaves, the third sheave sleeve comprising: a third sleeve bore, with a third sleeve inner diameter of a third value; and a third sleeve outer diameter that is about the same as the sheave body inner diameter as to allow a fixed attachment between the sleeve and any of the first through third grooved sheaves.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Figure 1:
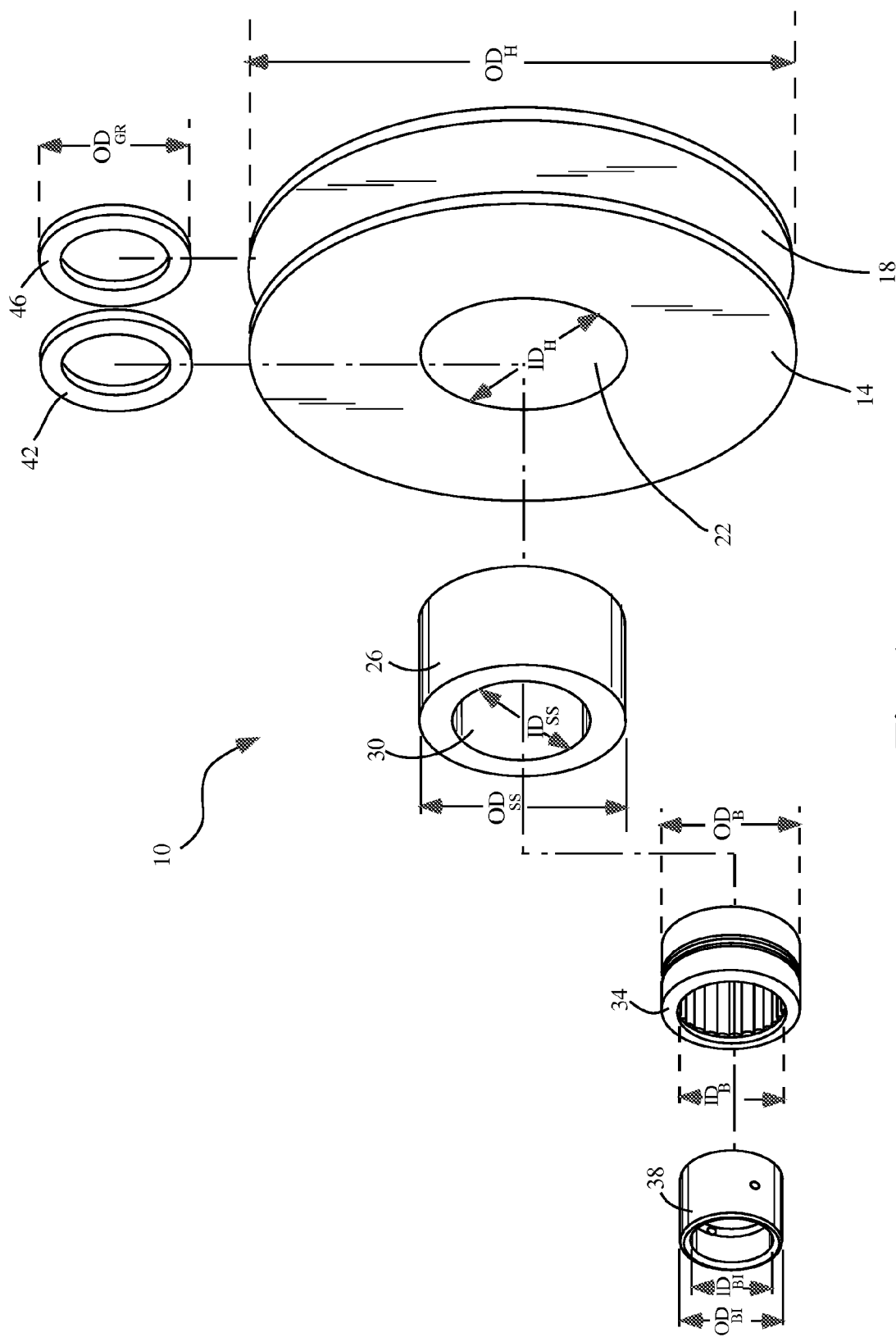
FIG. 1 is a perspective exploded view of one embodiment of the disclosed sheave.

FIG. 1 is an exploded perspective view of one embodiment of the disclosed sheave 10. The sheave comprises a grooved sheave body 14. The sheave body 14 comprises a groove 18, and a sheave bore 22 with an inner diameter $ID_H$. The sheave body has an outer diameter $OD_H$. A sheave sleeve 26 has an outer diameter $OD_{SS}$ and a sleeve bore 30 with an inner diameter $ID_{SS}$. The sheave sleeve 26 is configured to fit in the sheave body bore 22. $OD_{SS}$ may be sized with the respect to the $ID_H$ such that the sheave sleeve 26 may be press fit into the sheave body 14. In other embodiments, the sheave sleeve 26 may have an interference fit with the sheave bore 22, or the sheave sleeve 26 may be otherwise attached to the sheave bore 22, such as but not limited to a tack weld. In this embodiment of the disclosed sheave 10, the sheave sleeve 26 is configured to allow a bearing 34, such as but not limited to a roller bearing, to be press fit into the sleeve bore 30. The bearing has an outer diameter $OD_B$. In one embodiment the bearing 34 may be fitted directly onto a shaft. The bearing has an inner diameter $ID_B$. In other embodiment, a bearing insert 38 may be rotatedly attached to the bearing's $ID_B$, and be non-rotatably attached to a shaft via the bearing insert's inner diameter $ID_{BI}$. The bearing insert 38 will also have an outer diameter $OD_{BI}$. The bearing insert 38 may also be known as a bearing race. In other embodiments, optional grease retainers 42, 46, each with an outer diameter of $OD_{GR}$ will fit within the sheave sleeve bore 30, and are configured to retain lubricant within the sleeve bore 30, thus providing for lubrication to the bearing 34.

Figure 2:
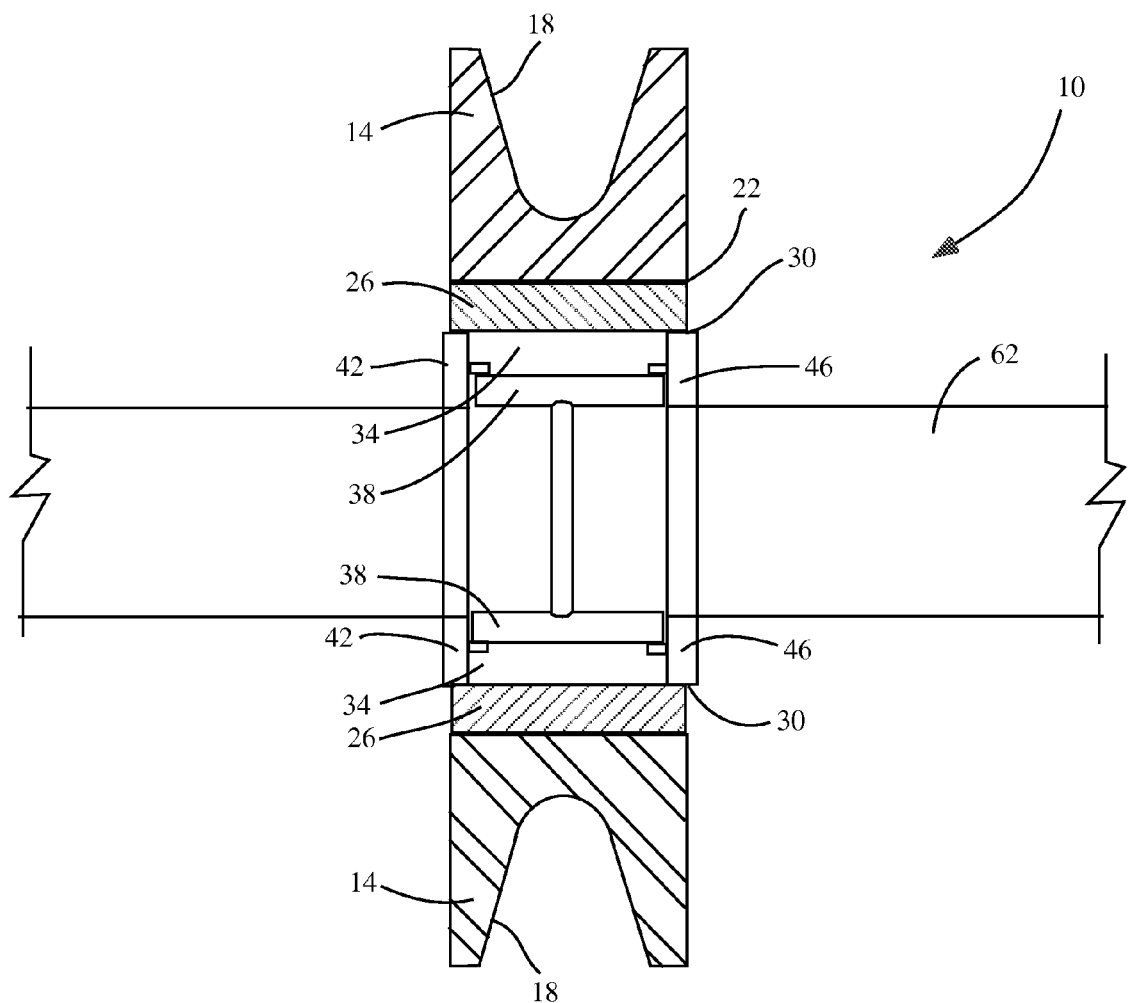
FIG. 2 is a cross-sectional view of the sheave from FIG. 1.

FIG. 2 shows a cross-sectional view of the sheave 10 above, assembled and with the sheave in rotatable communication with a shaft 62.

Figure 3:
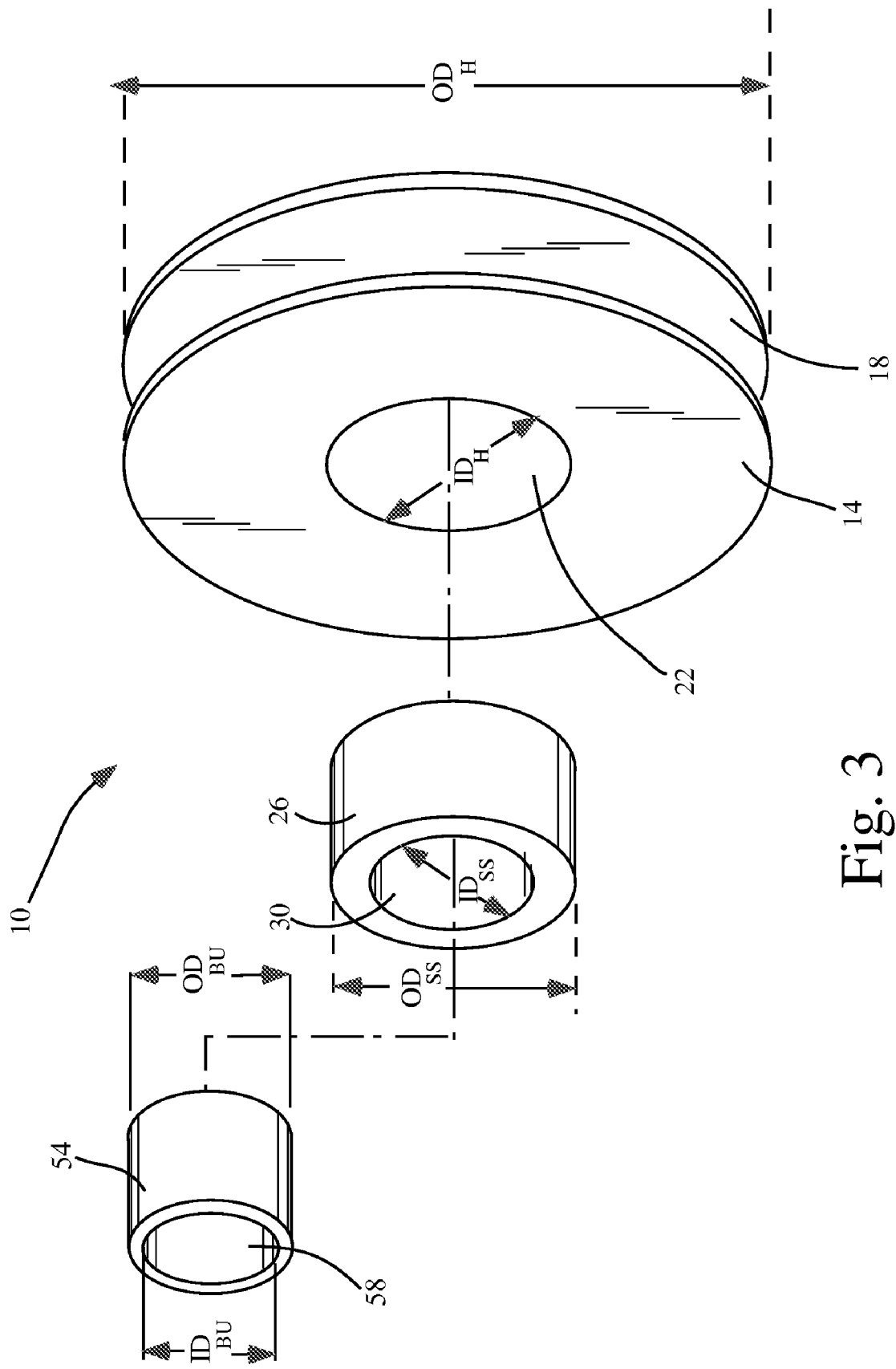
FIG. 3 is a perspective exploded view of another embodiment of the disclosed sheave.

FIG. 3 shows an exploded perspective view of another embodiment of the disclosed sheave 50. The sheave 50 comprises a grooved sheave body 14. The sheave body 14 comprises a groove 18, and a sheave bore 22 with an inner diameter $ID_H$, the sheave body has an outer diameter $OD_H$. A sheave sleeve 26 has an outer diameter $OD_{SS}$ and a sleeve bore 30 with an inner diameter $ID_{SS}$. The sheave sleeve 26 is configured to fit in the sheave bore 22. $OD_{SS}$ may be sized with the respect to the $ID_H$ such that the sheave sleeve 26 may be press fit into the sheave body 14. In other embodiments, the sheave sleeve 26 may have an interference fit with the sheave bore 22, or the sheave sleeve 26 may be otherwise attached to the sheave bore 22, such as but not limited to a tack weld. In this embodiment of the disclosed sheave 10, the sheave sleeve 26 is configured to allow a bushing 54, such as but not limited to a bronze bushing, to be press fit into the sleeve bore 30. The bushing 54 has an outer diameter $OD_{BU}$ and an inner diameter $ID_{BU}$. The bushing 54 has a bore 58 configured to allow a shaft to be in rotatable communication with the bushing 54, and located within the bushing 54. In one embodiment the bushing 54 may be fitted directly onto a shaft, via the $ID_{BU}$.

Figure 4:
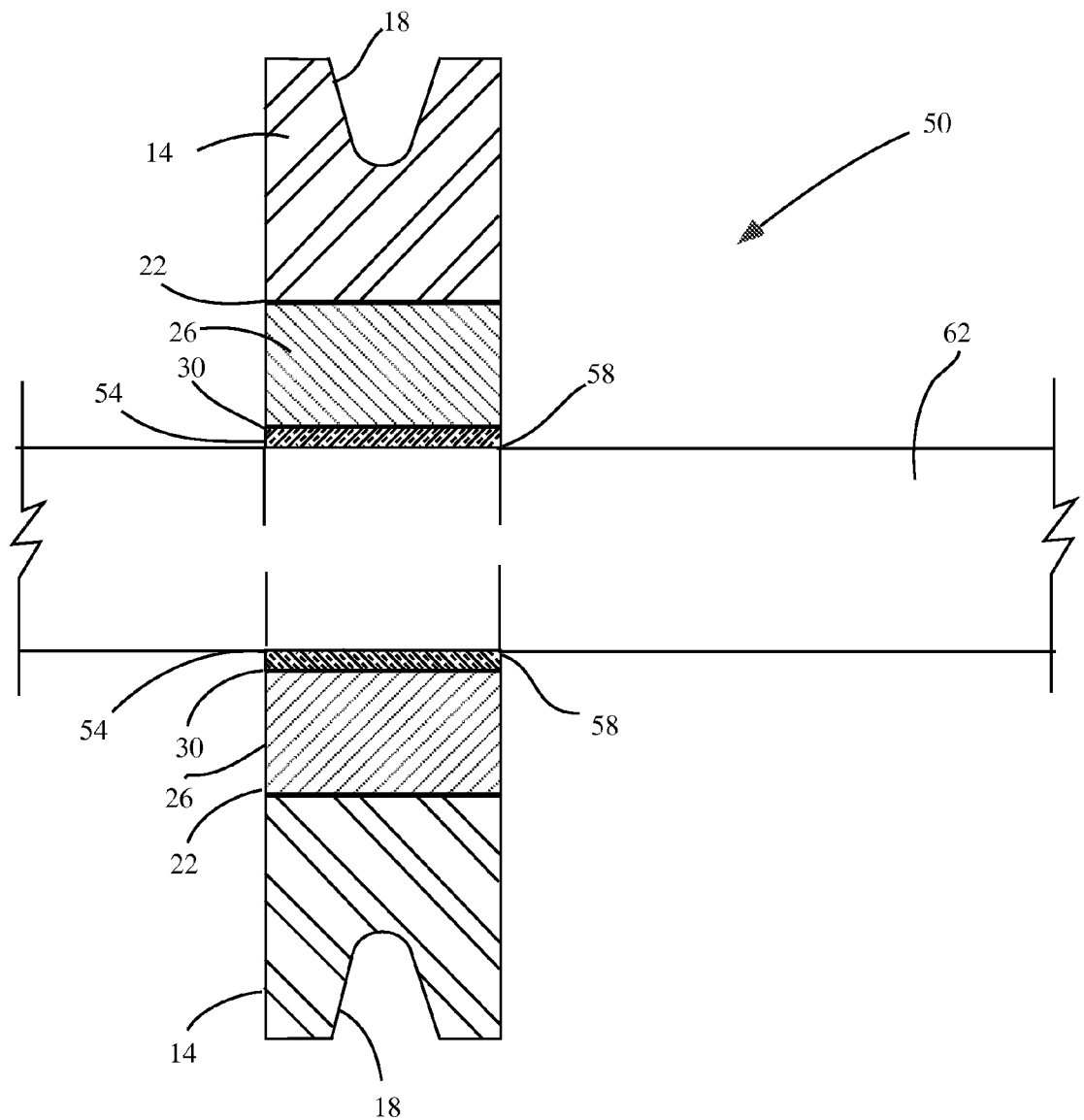
FIG. 4 is a cross-sectional view of the sheave from FIG. 3.

FIG. 4 shows a cross-sectional view of the sheave 50 above, assembled and with the sheave 50 in rotatable communication with a shaft 62.

TABLE 1

| Rope Size | Shaft Size | Bronze Bushing | | | | Roller Bearing | | | |
|---|---|---|---|---|---|---|---|---|---|
| | | 6" OD | 8" OD | 10" OD | 12" OD | 6" OD | 8" OD | 10" OD | 12" OD |
| 3/8 | 1.000 | X | X | X | X | | | | |
| | 1.250 | X | X | X | X | | | | |
| | 1.500 | X | X | X | X | X | X | X | X |
| | 1.625 | X | X | X | X | X | X | X | X |
| | 1.750 | X | X | X | X | X | X | X | X |
| | 2.000 | X | X | X | X | X | X | X | X |
| | 2.250 | X | X | X | X | | | | |
| 7/16 | 1.000 | X | X | X | X | | | | |
| | 1.250 | X | X | X | X | | | | |
| | 1.500 | X | X | X | X | X | X | X | X |
| | 1.625 | X | X | X | X | X | X | X | X |
| | 1.750 | X | X | X | X | X | X | X | X |
| | 2.000 | X | X | X | X | X | X | X | X |
| | 2.250 | X | X | X | X | | | | |
| 1/2 | 1.000 | X | X | X | X | | | | |
| | 1.250 | X | X | X | X | | | | |
| | 1.500 | X | X | X | X | X | X | X | X |
| | 1.625 | X | X | X | X | X | X | X | X |
| | 1.750 | X | X | X | X | X | X | X | X |
| | 2.000 | X | X | X | X | X | X | X | X |
| | 2.250 | X | X | X | X | | | | |
| 9/16 | 1.000 | X | X | X | X | | | | |
| | 1.250 | X | X | X | X | | | | |
| | 1.500 | X | X | X | X | X | X | X | X |
| | 1.625 | X | X | X | X | X | X | X | X |
| | 1.750 | X | X | X | X | X | X | X | X |
| | 2.000 | X | X | X | X | X | X | X | X |
| | 2.250 | X | X | X | X | | | | |
| 5/8 | 1.000 | X | X | X | X | | | | |
| | 1.250 | X | X | X | X | | | | |
| | 1.500 | X | X | X | X | X | X | X | X |
| | 1.625 | X | X | X | X | X | X | X | X |
| | 1.750 | X | X | X | X | X | X | X | X |
| | 2.000 | X | X | X | X | X | X | X | X |
| | 2.250 | X | X | X | X | | | | |

In one example of use of the disclosed invention, various sized grooved sheave bodies will be available (the various sized grooved sheave bodies may have different outer diameters, and groove sizes, as well as other differing specifications), however, each of the different sized grooved sheave bodies will have the same $ID_H$. Thus, one may have a plurality of 12 inch sheaves (12 inch $OD_H$), and a plurality of 6 inch sheaves (6 inch $OD_H$). However, both the 12 inch sheaves and the 6 inch sheaves will have the same $ID_H$. Thus, in order to fit the sheaves onto different sized shafts, one simply uses a sheave sleeve with an $OD_{SS}$ that is configured to fit in the $ID_H$ of either the 12 inch sheave or the 6 inch sheave, with the sheave sleeve being sized to have an $ID_{SS}$ to accommodate the bearing, or bushing that will fit over the shaft. Table 1, above, shows the variety of sheaves that a sheave manufacture may be required to produce for a customer. The first column is the diameter of various rope sizes that may be required to fit in the groove of the sheave. The second column is the outer diameter of the shaft that may attached to a bushing, such as but not limited to a bronze bushing, or to a bearing, such as but not limited to a roller bearing. Thus, for a ⅜ inch rope, the shaft sizes that should be available to a customer range from about 1.000 inch to about 2.250 inches. The third through sixth columns indicate that sheaves with ODs ranging from 6" to 12" are available with bronze bushings to accept all indicated shaft sizes (1.000 to 2.250) for a rope size of ⅜ inch. The seventh through tenth columns indicate that sheaves with ODs ranging from 6" to 12" are available to fit roller bearings that can accept shaft sizes of 1.5 to 2 inches (as shown by the Xs). The table shows four sheave sizes (6" OD, 8" OD, 10" OD, and 12" OD), five common rope sizes; seven popular shaft sizes with bronze bushings; and four popular shaft sizes with roller bearings. These sizes lead to 220 configurations of sheaves that may be specified by a customer. Thus, without the invention full stocking for quick delivery requires a supply of 220 sheave configurations. However, with the invention, full stocking for quick delivery requires: 20 common bore sheaves (5 rope sizes×4 sheave ODs); 5 sleeves; 7 bronze bushings; 4 roller bearings, a total of 36 components to be able to make any of the 220 sheave configurations. If a prudent sheave manufacture wants to be able to immediately ship out 10 of any type of sheave, then without the invention, the manufacturer would have to carry 2,220 sheaves, as opposed to only 360 components (with the invention).

Thus, the inventory cost for using the disclosed invention is much lower than if one had to assemble sheaves according to customer specification without the disclosed invention. For example, if a manufacturer were to provide for sheave sizes of 6, 8, 10 and 12 inches ($OD_H$), and the capacity to handle rope sizes of ½, 9/16, ⅝, ¾ and 1 inch (the rope will communicate with the sheave via the groove 18), and 7 different bore sizes (the bore sizes corresponding to the size of the bore required to accept the shaft, in one example this would be the inner diameter of the bushing 54, or in another example, this would be the inner diameter of the roller bearing insert 38, this would lead to 390 combinations of unique sheaves. In order to make 10 units of any particular sized sheave, using the disclosed invention, the inventory costs to stock the sheaves, sleeves, and bearings would be less than $10,000. However, without the invention, the inventory costs to be able to make 10 units of any particular sized sheaves out of the 390 different possible combinations would be over $750,000, due to the number of parts required to have on hand to be able to produce the variety sheaves that may be required by users. Without using the disclosed invention, one must have in stock a different sized sheave, each sheave having a specific groove size, specific outer diameter, and a specific inner diameter to fit a specific bearing size and/or bushing size.

The disclosed sheave and sheave system has many advantages. It allows one to produce sheaves according to a variety of specifications, at a much lower inventory cost. Using the disclosed invention, one need not stock sheaves with many different sizes of inner diameters, but rather just one or a few inner diameters would be necessary, because one would vary the size of bearing or bushing that the sheave could hold by using different sized sheave sleeves. The invention shortens the lead time to manufacture a sheave to about 72 hours or less. With the invention, sheave manufacturer can have a variety of sheaves stocked in his inventory, i.e. sheaves with different OD's, sheave body widths, and groove types, but each of the variety of sheaves will have the same inner diameter to fit a sheave sleeve. Additionally, the sheave manufacturer can have a variety of sheave sleeves with different sized bores (the inner bore size of the sleeve that the customer specified) in his inventory. Using this system of sheaves and sheave sleeves, will allow the manufacturer to maintain a manageable inventory of sheave sizes, sheave sleeve sizes, and bearings. Thus, by simply combining the proper sheave with the proper sheave sleeve and the proper bearing, a manufacturer can produce the specified sheaves for a client much quicker with inventory on hand, as opposed to having to custom manufacture each sheave order, which can take up to 4 to 26 weeks. In the example discussed above, the invention reduces the number of sheaves from 220 to 20. The invention increases manufacturing efficiencies because 20 different sheaves (for example) have fewer set-ups and longer runs than 220 different sheaves (for example). The invention facilitates customization for special requirements. Special sleeves can be made on a custom basis to provide for a wider bearing, ball bearings, and special bushings. The cost and lead-time savings over a 100% custom sheave are large.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A sheave system comprising:
   a first grooved sheave, with an outer diameter of a first value; a first groove size, and a sheave body inner diameter of a first value;
   a second grooved sheave, with an outer diameter of a second value; a second groove size, and a sheave body inner diameter of a first value;
   a third grooved sheave, with an outer diameter of a third value; a third groove size, and a sheave body inner diameter of a first value;
   a first sheave sleeve configured to be fixedly attached to any of the first through third grooved sheaves, the first sheave sleeve comprising:
      a first sleeve bore, with a first sleeve inner diameter of a first value;
      a first sleeve outer diameter that is about the same as the sheave body inner diameter as to allow a fixed attachment between the sleeve and any of the first through third grooved sheaves;
   a second sheave sleeve configured to be fixedly attached to any of the first through third grooved sheaves, the second sheave sleeve comprising:
      a second sleeve bore, with a second sleeve inner diameter of a second value;
      a second outer diameter that is about the same as the sheave body inner diameter as to allow a fixed attachment between the second sheave sleeve and any of the first through third grooved sheaves;
   a third sheave sleeve configured to be fixedly attached to any of the first through third grooved sheaves, the third sheave sleeve comprising:
      a third sleeve bore, with a third sleeve inner diameter of a third value; and
      a third sleeve outer diameter that is about the same as the sheave body inner diameter as to allow a fixed attachment between the sleeve and any of the first through third grooved sheaves.

2. The sheave system of claim 1, further comprising:
   an nth grooved sheave with an outer diameter of an nth value; an nth groove size, and a sheave body inner diameter of a first value;
   and where the first, second and third sheave sleeves are also configured to be fixedly attached to the nth grooved sheaves; and
   where n is an integer greater than 3.

3. The sheave system of claim 1, further comprising:
   an nth grooved sheave with an outer diameter of an nth value; an nth groove size, and a sheave body inner diameter of a first value;
   and where the first, second and third sheave sleeves are also configured to be fixedly attached to the nth grooved sheaves; and
   where n is a positive integer.

4. The sheave system of claim 1, further comprising:
   an nth sheave sleeve configured to be fixedly attached to any of the first through third grooved sheaves, the nth sheave sleeve comprising:
      an nth sleeve bore, with an nth sleeve inner diameter of an nth value; and
      an nth sleeve outer diameter that is about the same as the sheave body inner diameter as to allow a fixed attachment between the nth sleeve and any of the first through third grooved sheaves;
   wherein n is an integer greater than 3.

5. The sheave system of claim 1, further comprising:
   a first bearing configured to fixedly attach to the first sheave sleeve, the first bearing comprising:
      a first bearing outer diameter of a first value that is about the same as the first sleeve inner diameter as to allow a fixed attachment between the first bearing and the first sheave sleeve;
   a second bearing configured to fixedly attach to the second sheave sleeve, the second bearing comprising:
      a second bearing outer diameter of a second value that is about the same as the second sleeve inner diameter as to allow a fixed attachment between the second bearing and the second sheave sleeve; and
   a third bearing configured to fixedly attach to the third sheave sleeve, the third bearing comprising:
      a third bearing outer diameter of a third value that is about the same as the third sleeve inner diameter as to allow a fixed attachment between the third bearing and the third sheave sleeve.

6. The sheave system of claim 1, further comprising:
   a first bushing configured to fixedly attach to the first sheave sleeve, the first bushing comprising:
      a first bushing outer diameter of a first value that is about the same as the first sleeve inner diameter as to allow a fixed attachment between the first bushing and the first sheave sleeve;
   a second bushing configured to fixedly attach to the second sheave sleeve, the second bushing comprising:
      a second bushing outer diameter of a second value that is about the same as the second sleeve inner diameter as to allow a fixed attachment between the second bushing and the second sheave sleeve; and
   a third bushing configured to fixedly attach to the third sheave sleeve, the third bushing comprising:
      a third bushing outer diameter of a third value that is about the same as the third sleeve inner diameter as to allow a fixed attachment between the third bushing and the third sheave sleeve.

* * * * *